J. W. GAMBLE.
TRACTOR BINDER HITCH.
APPLICATION FILED AUG. 7, 1916.
1,225,428.
Patented May 8, 1917.
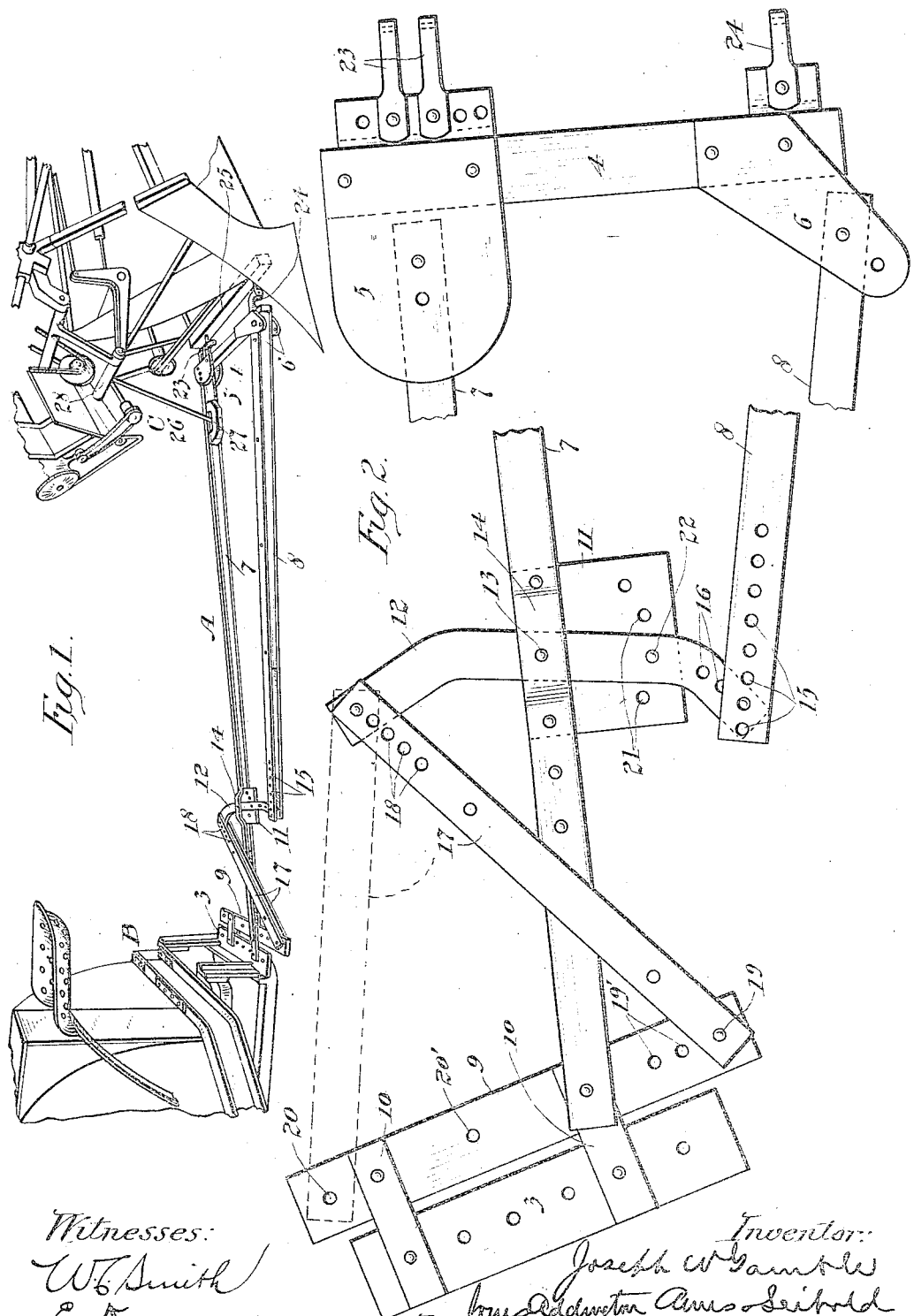

UNITED STATES PATENT OFFICE.

JOSEPH W. GAMBLE, OF CARPENTERSVILLE, ILLINOIS.

TRACTOR-BINDER HITCH.

1,225,428.

Specification of Letters Patent. Patented May 8, 1917.

Application filed August 7, 1916. Serial No. 113,467.

*To all whom it may concern:*

Be it known that I, JOSEPH W. GAMBLE, a citizen of the United States, residing at Carpentersville, in the county of Kane and State of Illinois, have invented new and useful Improvements in Tractor-Binder Hitches, of which the following is a full, clear, concise, and exact description, reference being had to the accompanying drawing, forming a part of this specification.

My invention relates to improvements in tractor binder hitches, and has for its object the production of a device, the use of which will permit the turning of square corners and insure a uniform cut.

A further object is the production of a device by means of which the width of the swath cut may be regulated.

A further object is the production of a device in which the outer end of the binder may be kept from swinging forward or back as desired.

A further object is the production of a device of cheap and simple construction, easily adjustable to fulfil various uses to which it may be put and not liable to disarrangement of parts.

These and such other objects as may hereinafter appear are obtained by my device, an embodiment of which is illustrated in the accompanying drawings in which—

Figure 1 represents a perspective view of my device attached to the rear of a tractor and front of a binding machine; and Fig. 2 represents an enlarged top plan view of my device.

Like numerals of reference indicate like parts in the several figures of the drawings.

Referring now to the drawing, in Fig. 1 is shown my improved binder hitch A in operative position between the tractor B and a binder C, the device being rigidly secured to the tractor beam bar 3. The device proper comprises a cross bar 4 on either side of which are mounted retaining plates 5 and 6, the bar being secured between the plates. A main bar 7 is secured at its rear end between the plates 5, and a grain bar 8 is secured at its rear end between the plates 6. The forward end of the main bar is pivotally secured to an extension bar 9 and the extension bar is rigidly secured to the tractor draw bar 3 by means of straps 10—10. A supporting plate 11 is rigidly mounted on the main bar and extending toward the grain side opposite the end of the grain bar 8. A rocker lever 12 is pivotally mounted on the main bar at 13, a strap 14 being secured at the top and bottom of the plate and raised from the surface permitting the movement of the rocker lever over the surface of the plate, the strap serving to retain the rocker lever in operative position without any undue strain on the pivot.

The rocker lever is connected at its grain end to the end of the grain bar 8, the end of the grain bar being provided with a plurality of bolt holes 15, and the end of the rocker lever having corresponding bolt holes 16 permitting a variety of adjustments between the ends of the two members. The stubble side of the rocker lever is pivotally connected to a cross strap 17, the cross strap being provided with a plurality of bolt holes 18 permitting a similar adjustment between the two members. The upper end of the cross strap 17 is pivotally connected at 19 to the grain end of the extension bar 9, this bar also having a plurality of bolt holes 19' on the grain side, and additional bolt holes 20—20' on the stubble side, as will be explained later.

The plate 11 is provided with a plurality of bolt holes 21 positioned in the arc of the circle, the center of which is the pivotal point 13, and a bolt hole 22 is positioned in the rocker lever and adapted to register with the bolt holes 21 making it possible, by the insertion of a bolt through 21, to rigidly secure and rock the rocker lever in any desired position and rigid with the main bar. The connection between the device and the binder may be effected by pairs of clevises 23—24 swingingly secured to the rear bar 25 of the binder. A tilting bar 26 is also provided pivotally mounted on the main bar as at 27 and on the binder at 28. It will be noted that by reason of the various bolt holes provided in the various members and plates a uniform variety of adjustments of the various parts of the device may be effected.

Referring now to the operation of my device in the form illustrated I show the device in its normal position with the cross bar attached to the grain end of the extension. In this position when the tractor turns the corner left the outer end of the binder is brought forward and when started is turned away and the end is thrown back in line. The cross bar at the front end of the grain bar is provided with holes as shown to adjust the cut of the binder by moving the lever at the front end of the grain bar forward or back. In the event that it is desired to keep the entire end of the binder from swinging forward or back it is only necessary to remove the cross strap and put a bolt through the lever and screw it tight. This makes a rigid hitch.

I have shown in full lines, in Figs. 1 and 2, the normal position. In order to arrange the device so as to throw the outer end of the binder back when turning and forward when starting straight away the forward end of the cross strap is disconnected from the grain side of the extension bar and transferred to the opposite end, as indicated at 20. The lower end of the cross strap may remain in the extreme end of the rocking lever or can be moved upwardly in one of the holes farther toward the forward end of the cross strap, thus adjusting the swing of the machine. By removing the cross strap and leaving the rocker lever rigid with the plate the rigid hitch is provided, or, if desired, the rocker lever and cross strap may both be eliminated and the forward end of the grain bar itself bolted to the plate, the various bolts in both the forward end of the grain bar and the plate itself permitting any desired degree of adjustment.

In the event that the tractor has a long cross draw bar the extension bar can be dispensed with, although in ordinary conditions it is advisable to provide the extension bar as shown in the drawings.

It will thus be seen that with my construction any degree of adjustment may be obtained by simply shifting the relative position of the grain bar, cross strap and rocker lever.

Other details of construction will appear that in no way depart from the spirit of my invention.

Having thus described my invention what I claim as new and desire to secure by Letters Patent is;—

1. In a device of the class described a main bar adapted to connect with a tractor draw bar, a rocking lever, a plate adapted to support said rocking lever mounted on said main bar, and means for adjustably securing said rocking lever to said tractor draw bar.

2. In a device of the class described a main bar adapted to connect with a tractor draw bar, a rocking lever, a plate mounted on said main bar below said rocking lever, and means for securing said rocking lever rigidly to said plate, and means for adjustably securing said rocking lever to said tractor draw bar.

3. In a device of the class described a main bar adapted to connect with a tractor draw bar, a rocking lever mounted on said main bar, a plate supporting said rocking lever and means whereby said lever may be adjustably mounted on said plate, and a cross strap connecting the opposite end of said rocking lever to either end of said tractor draw bar.

4. In a device of the class described, a main bar, one end of which is adapted to be secured to the forward end of an implement and the front end secured to the rear end of the tractor, and a grain bar positioned on the grain side of said main bar, and means for adjustably securing said grain bar to said main bar, said means including a rocking lever pivotally mounted on said main bar and a plate containing means for holding said rocking lever in any desired position.

5. In a tractor binder hitch the combination with a rear bar, a main bar, a grain bar pivotally mounted thereon, a rocking lever mounted on said main bar, a plate mounted on said main bar to which said rocking lever may be rigidly secured, the end of said grain bar being pivotally connected to the left-hand side of said rocking lever, a forward extension bar to which said main bar is pivotally secured, and a cross strap connecting the right hand end of said rocking lever to one end of said extension bar.

6. In a tractor binder hitch the combination with a rear bar, a main bar, a grain bar pivotally mounted thereon, a rocking lever mounted on said main bar, a plate mounted on said main bar to which said rocking lever may be rigidly secured, the end of said grain bar being pivotally connected to the grain side of said rocking lever, a forward extension bar to which said main bar is pivotally secured, and a cross strap connecting the stubble end of said rocking lever to either side of said extension bar, and means for connecting said extension bar to a tractor draw bar.

In witness whereof, I have hereunto subscribed my name in the presence of two witnesses.

JOSEPH W. GAMBLE.

Witnesses:
  Wm. Rocke,
  A. B. Pixley.